(12) United States Patent
Cook

(10) Patent No.: US 8,710,805 B2
(45) Date of Patent: Apr. 29, 2014

(54) SQUIB CONTROL CIRCUIT

(75) Inventor: Bruce M. Cook, Pittsburgh, PA (US)

(73) Assignee: Westinghouse Electric Company, LLC, Cranberry Township, PA (US)

(*) Notice: Subject to any disclaimer, the term of this patent is extended or adjusted under 35 U.S.C. 154(b) by 365 days.

(21) Appl. No.: 13/235,538

(22) Filed: Sep. 19, 2011

(65) Prior Publication Data

US 2013/0069602 A1 Mar. 21, 2013

(51) Int. Cl.
H02J 7/00 (2006.01)

(52) U.S. Cl.
USPC .......................................................... 320/166

(58) Field of Classification Search
USPC .......................................................... 320/166
See application file for complete search history.

(56) References Cited

U.S. PATENT DOCUMENTS

| 3,439,616 | A | | 4/1969 | Godsey et al. | |
|---|---|---|---|---|---|
| 3,665,860 | A | * | 5/1972 | West | 102/220 |
| 5,433,184 | A | | 7/1995 | Kinoshita et al. | |
| 5,554,890 | A | | 9/1996 | Kinoshita | |
| 5,657,194 | A | * | 8/1997 | Waltz | 361/75 |
| 6,168,197 | B1 | | 1/2001 | Paganini et al. | |
| 7,154,732 | B2 | | 12/2006 | Bennett | |
| 2002/0000787 | A1 | * | 1/2002 | Minamiura et al. | 320/125 |
| 2004/0231545 | A1 | * | 11/2004 | Lloyd | 102/202.5 |

* cited by examiner

Primary Examiner — Arun Williams
(74) Attorney, Agent, or Firm — Joseph C. Spadacene; Westinghouse Electric Company, LLC

(57) ABSTRACT

An improved control circuit that is structured to energize another device such as a squib. A first portion of the circuit includes a first transistor and is structured to discharge at a first rate a first portion of a charge stored by a capacitor. Another portion of the circuit includes a second transistor and is structured to discharge a second portion of the charge subsequent to the discharge of the first portion of the charge and at a second rate greater than the first rate.

14 Claims, 1 Drawing Sheet

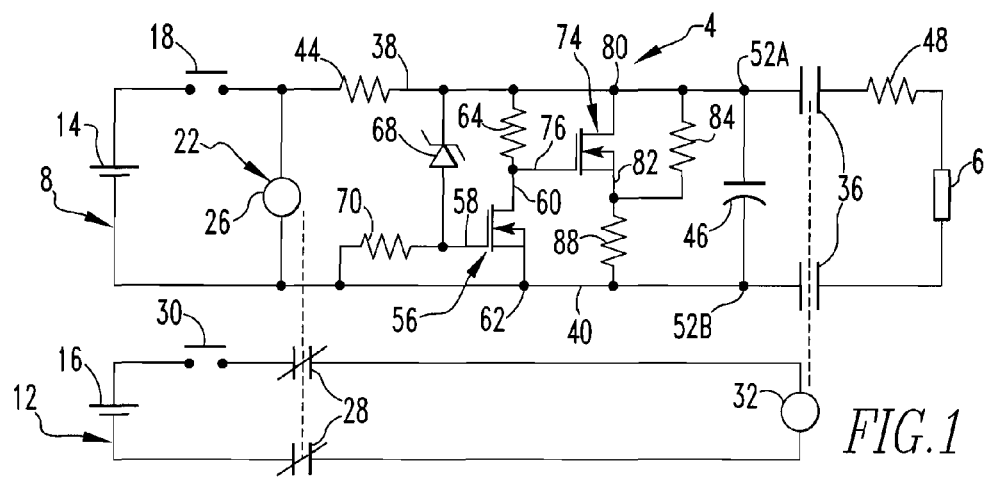
FIG.1
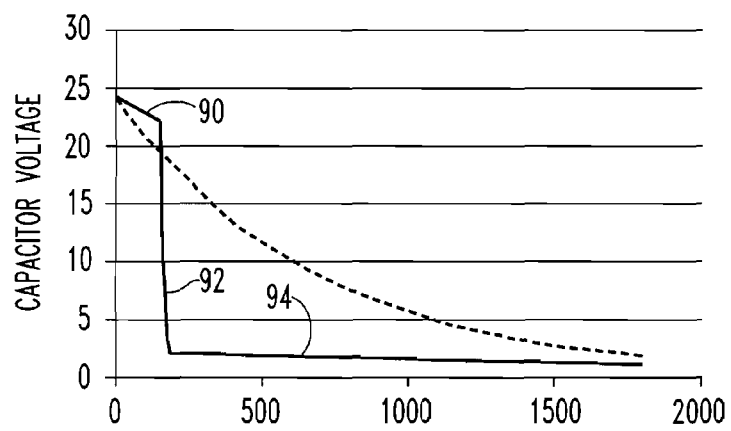
FIG.2 TIME FOLLOWING ARM RELEASE (SECONDS)
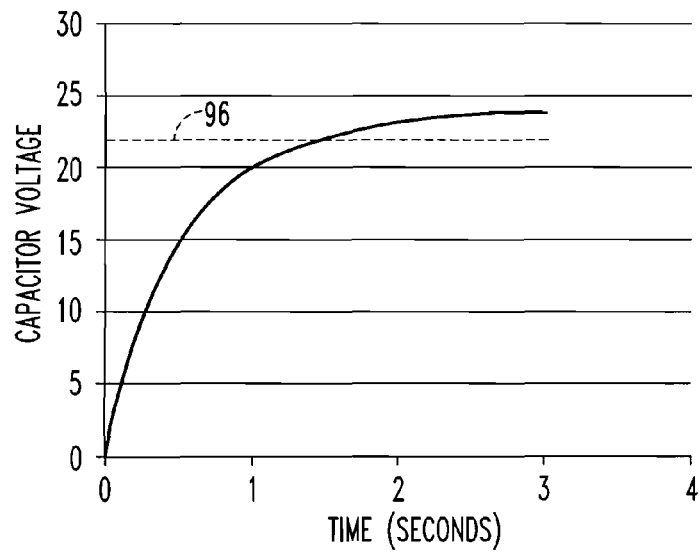
FIG.3 TIME (SECONDS)

SQUIB CONTROL CIRCUIT

BACKGROUND

1. Field

The disclosed and claimed concept relates generally to control circuitry and, more particularly, to an improved control circuit for energizing another device such as a squib.

2. Related Art

As is generally known, a squib is a small explosive device that is employed in various applications. For instance, it may be employed to create special effects in filmmaking, for military uses, and in other applications where it may be necessary to explosively break a safety bolt or other structure in an emergency setting. Other uses for squibs are generally well known.

A particular example of an emergency-related application of a squib is for an explosively activated valve or other component in a nuclear reactor. In such an application, as well as in other applications, a tradeoff always exists between ensuring reliable operation when needed while preventing unintended operations at other times. Known circuits that control the energizing of a squib have typically employed a capacitor which, once charged, is then discharged to energize the squib.

In applications such as the emergency-related applications mentioned above and other applications, the capacitor is typically charged upon the issuance of an ARM command and is then discharged, if appropriate, through the issuance of a FIRE command to employ the charged capacitor to energize the squib. It is desirable in such an application to dissipate within a predetermined period of time the charge stored within the capacitor if the FIRE command is not issued. An example of such a predetermined period of time may be a duration of no more than five minutes. However, it is also desirable that such dissipation of the charge begin only after a predetermined period of time during which the charge will be sufficient to energize the squib, such as a duration of at least thirty seconds.

That is, in such an application it is desirable that the FIRE command is available for a first predetermined period of time after issuance of the ARM command, but that the capacitor is discharged to a safe state of charge within a second predetermined period of time after issuance of the ARM command if the FIRE command is not issued. This is desired in order to avoid the squib being unintentionally energized. Thus, it is desirable that, for at least a first predetermined period of time, the capacitor will remain energized sufficiently to energize the squib, but that after the predetermined period of time the capacitor will become promptly de-energized within another predetermined period of time after arming to place the capacitor in a safe state.

While known circuits have been generally effective for their intended purposes, they have not been without limitation. More particularly, the aforementioned tradeoff between maintaining a charge for a predetermined period of time yet discharging the charge within a subsequent predetermined period of time has been difficult to reliably achieve. It thus would be desirable to provide an improved circuit that enables the maintaining of a charge for a predetermined period of time and also the discharging of the charge within another predetermined period of time.

SUMMARY

These and other benefits are provided by an improved control circuit that is structured to energize another device such as a squib. A first portion of the circuit includes a first transistor and is structured to discharge at a first rate a first portion of a charge stored by a capacitor. Another portion of the circuit includes a second transistor and is structured to discharge a second portion of the charge subsequent to the discharge of the first portion of the charge and at a second rate greater than the first rate.

Accordingly, an aspect of the disclosed and claimed concept is to provide an improved control circuit that is structured to charge a capacitor responsive to an ARM command in order to enable a squib to be energized, as appropriate, but that is also configured to promptly dissipate the charge stored by the capacitor if a FIRE command is not issued within a predetermined period of time.

Another aspect of the disclosed and claimed concept is to provide such an improved circuit that maintains for a first predetermined period of time from the issuance of the ARM command a charge sufficient to energize the squib if a FIRE command is issued, but that dissipates the charge to a safe state within a second predetermined period of time from the issuance of an ARM command if a FIRE command is not issued.

Another aspect of the disclosed and claimed concept is to provide an improved circuit that is structured to enable a squib to be energized and that employs two transistors and other components that enable the discharging of a charge on a capacitor at two different discharge rates at two different times.

These and other aspects of the disclosed and claimed concept are provided by an improved circuit that is structured to energize another device. The circuit can be generally stated as including a capacitor structured to at least temporarily store a charge. A portion of the circuit can be generally stated as including a first solid state switch and being structured to discharge a first portion of the charge at a first rate. Another portion of the circuit can be generally stated as including a second solid state switch and being structured to discharge a second portion of the charge subsequent to the discharge of the first portion of the charge and at a second rate greater than the first rate. The capacitor has stored therein prior to the onset of the discharge of the second portion of the charge a portion of the charge sufficient to energize the other device.

BRIEF DESCRIPTION OF THE DRAWINGS

A further understanding of the disclosed and claimed concept can be gained from the following Description when read in conjunction with the accompanying drawings in which:

FIG. 1 is a circuit diagram of an improved circuit in accordance with the disclosed and claimed concept;

FIG. 2 is an exemplary chart depicting capacitor voltage as a function of time with the use of the circuit of FIG. 1; and FIG. 3 is a exemplary chart depicting the capacitor voltage as a function of time during a charging cycle of the circuit of FIG. 1.

Similar numerals refer to similar parts throughout the specification.

DESCRIPTION

An improved squib control circuit 4 in accordance with the disclosed and claimed concept is depicted generally in FIG. 1. The squib control circuit 4 is depicted as being connected with an explosive squib 6 which the squib control circuit 4 is structured to energize, depending upon appropriate commands.

The squib control circuit 4 can be generally stated as including an arming component 8 and a firing component 12 that cooperate in a fashion set forth below. The arming component 8 is depicted as being connected with a first electrical energy source 14, and the firing component 12 is depicted as being connected with a second electrical energy source 16. The first and second electrical energy sources 14 and 16 are, in the embodiment depicted herein, batteries that provide electrical power at twenty-four (24) volts DC. It is understood, however, that other energy sources such as AC to DC converters (i.e., power supplies), fuel cells, and the like can be employed, and they may be at different voltages than those expressly described herein without departing from the present concept.

The arming component 8 includes an ARM switch 18, and further includes an interlock 22 that enables cooperation between the arming component 8 and the firing component 12. More particularly, the interlock 22 includes an interlock relay 26 on the arming component 8 and further includes a pair of interlock switches 28 on the firing component 12. It can also be seen that firing component 12 includes a FIRE switch 30 and a firing relay 32, with the firing relay 32 being operatively connected with a pair of energizing switches 36 on the arming component 8.

During the arming and firing operations, the arming component 8 first receives an ARM command, such as from a computerized controller, although such command can occur manually. Such an ARM command would close the ARM switch 18 and would also include a command to place the interlock relay 26 in a first state which would cause the pair of interlock switches 28 to remain in an OPEN condition. Once the arming component 8 has been charged sufficiently, the ARM switch 18 would be opened by another command that would halt further charging of the arming component 8 and would cause the interlock relay 26 to switch to a second state that would move the pair of interlock switches 28 from their OPEN condition to a CLOSED condition. Again, this could be done manually.

If at this point a FIRE command is issued, the FIRE switch 30 would be moved to its CLOSED position and the firing relay 32 would be caused to change states which would switch the pair of energizing switches 36 from an OPEN condition to a CLOSED condition, which would result in the squib 6 being energized and exploding. As will be set forth in greater detail below, however, if the FIRE command is not issued within a first predetermined period of time, the arming component 8 will be promptly discharged within a second predetermined period of time in order to avoid the squib 6 being unintentionally energized.

More particularly, and with continued attention being directed to FIG. 1, it can be seen that the arming component 8 includes a positive leg 38 and a ground leg 40 that are connected with the first electrical energy source 14 and also with the squib 6. The positive leg 38 includes a charging resistor 44 in series therewith. The arming component 8 additionally includes a capacitor 46 that is connected between the positive and ground legs 38 and 40 in parallel with the squib 6, albeit separated therefrom by the pair of energizing switches 36. FIG. 1 also depicts a cable resistance 48 that must be considered when configuring the squib control circuit 4 since the squib 6 itself may be spaced a meaningful distance from the arming component 8 and thus likely will have resistance that is beyond a nominal level.

As can be understood from FIG. 1, when the ARM command is issued and the ARM switch 18 is closed, the first electrical energy source 14 supplies electrical current to the capacitor 46 through the charging resistor 44, and the capacitor 46 becomes charged thereby. It is noted that capacitor vendors typically suggest that if a capacitor such as the capacitor 46 is a solid tantalum capacitor that the charging resistor 44 have a resistance of no less than three ohms per volt. In the exemplary embodiment depicted herein, the charging resistor 44 has a resistance of 75Ω although other resistance values can be used depending upon the needs of the application and the specifications of the other components of the control circuit.

The capacitor 46 has a pair of terminals of 52A and 52B, with the terminal 52A being connected with the positive leg 38, and with the terminal 52B being connected with the ground leg 40. In the exemplary embodiment depicted herein, the capacitor 46 has a capacitance of 6800 μF, although other capacitance values can be used depending upon the needs of the application and the specifications of the other components of the control circuit.

The arming component 8 further includes a first transistor 56 which can be said to constitute a solid state switch. In the example presented herein, the first transistor 56 is an n-channel MOSFET transistor. The first transistor 56 may be, for example and without limitation, an IRLZ14S n-channel MOSFET, although other transistors and other switches in general may be employed without departing from the present concept.

The first transistor 56 includes a Gate 58, a Source electrode 60, and a Drain electrode 62. A first resistor 64 is connected between the Source electrode 60 and the positive leg 38. In the exemplary embodiment depicted herein, the first resistor 64 has a resistance value of 500 KΩ, although other resistance values may be employed depending upon the needs of the particular application. The Drain electrode 62 is, in the depicted exemplary embodiment, connected directly with the ground leg 40.

The arming component 8 additionally includes a Zener diode 68 connected in the depicted fashion between the positive leg 38 and the Gate 58 of the first transistor 56. The Zener diode 68 in the present exemplary embodiment has a breakdown voltage of twenty (20) volts, although other Zener diodes can be employed having different breakdown voltages depending upon the needs of the circuit and the specifications of the other components thereof. Opposite the connection of the Zener diode 68 with the positive leg 38, the arming component 8 additionally includes a dissipation resistor 70 connected between the Zener diode 68 and the ground leg 40. In the exemplary embodiment depicted herein, the dissipation resistor 70 has a resistance value of 100 KΩ, although other resistance values may be employed depending upon the needs of the particular application. While a large resistance value for the dissipation resistor 70 will reduce the power dissipation of the Zener diode 68, too large a resistance value will prevent the first transistor 56 from turning OFF due to leakage through the Zener diode 68. As will be set forth in greater detail below, the first transistor 56 enables the arming component 8 to discharge at a first rate a first portion of the charge stored by the capacitor 46.

The arming component 8 further includes a second transistor 74 which, in the embodiment depicted herein, has specifications similar to the first transistor 56, although this need not necessarily be the case depending upon the needs of the particular application and the specifications of the other components of the circuit. The second transistor 74 includes a Gate 76, a Source electrode 80, and a Drain electrode 82. The Gate 76 of the second transistor 74 is, as is indicated in FIG. 1, connected with the Source electrode 60 of the first transistor 56 as well as the first resistor 64. The Source electrode 80 of the second transistor 74 is connected directly with the positive leg 38.

As can further be seen from FIG. 1, the arming component 8 additionally includes a second resistor 84 connected between the positive leg 38 and the Drain electrode 82 of the second transistor 74. In the exemplary embodiment depicted herein, the second resistor 84 has a resistance value of 500 KΩ, although other resistance values potentially may be employed depending upon the needs of the particular application. The Drain electrode 82 and the second resistor 84 are further connected with a third resistor 88 of the arming component 8 that is also connected with the ground leg 40. In the exemplary embodiment depicted herein, the third resistor 88 has a resistance value of 2 KΩ, although other resistance values potentially may be employed depending upon the needs of the particular application. As will be set forth in greater detail below, the second transistor 74 enables a second portion of the charge stored in the capacitor 46 to be discharged at a second rate greater than the first rate.

As suggested above, if a FIRE commend is issued soon after the capacitor 46 is fully charged (assuming that the ARM switch 18 is opened and the interlock relay 26 is caused to change to the second state and to move the pair of interlock switches 28 to their OPEN condition), the charge stored in the capacitor 46 will be electrically communicated to the squib 6, which will cause the squib 6 to become energized and to explode, by way of example. However, if no FIRE command is issued after the full charging of the capacitor 46, the opening of the ARM switch 18, and the switching of the interlock relay 26 to its second state, the capacitor 46 will at least initially be fully charged and will have a voltage across its terminals 52A and 52B of 24 volts in the present example. In the depicted exemplary embodiment, the threshold voltage for the first resistor 64, i.e., the voltage which applied to the Gate 58 will generate a conductive channel between the Source and Drain electrodes 60 and 62, is approximately one (1) or two (2) volts. Since the breakdown voltage of the Zener diode 68 is 20 volts in the depicted exemplary embodiment, the fully charged capacitor 46 having a voltage of 24 volts minus the 20 volt breakdown voltage of the Zener diode 68 will at least initially provide at least roughly four (4) volts to the Gate 58. This will turn the first transistor 56 to an ON state. It is noted that when the first transistor 56 is an ON state, the voltage at the Gate 76 of the second transistor 74 will be kept low, thus keeping the second transistor 74 in an OFF state.

In such a situation, a first portion of the charge stored in the capacitor 46 will be discharged at a first rate through two parallel electrical channels, i.e., through a first channel that includes the first resistor 64 and the channel between the Source and Drain electrodes 60 and 62, and a second channel through the second resistor 84 in series with the third resistor 88. The first rate of discharge of the charge stored in the capacitor 46 is indicated at the first segment 90 in FIG. 2. In the present exemplary embodiment where the first and second resistors 64 and 84 both have a resistance of approximately 500 KΩ, and wherein the third resistor 88 has a resistance of roughly 2 KΩ, the discharging of the first portion of the charge in the capacitor 46 at the first rate will last roughly 150 seconds, i.e., two and one-half minutes. During this entire period, however, the charge in the capacitor 46 is at a sufficient level to energize the squib 6, so the capacitor 46 remains charged and able to execute a FIRE command for 150 seconds, i.e., two and one-half minutes, after completion of the ARM command in the depicted exemplary embodiment.

As the first portion of the charge stored in the capacitor 46 is discharged at the first rate, voltage across the terminals 52A and 52B of the capacitor 46 drops as is indicated in the first segment 90 of FIG. 2. Eventually, a point will be reached where the voltage across the terminals 52A and 52B is no longer sufficient to keep the first transistor 56 in an ON condition. As suggested above, this will occur approximately 150 seconds after completion of the ARM command. Once the charge in the capacitor 46 has dropped sufficiently that the voltage across its terminals 52A and 52B can no longer meet the threshold voltage of the first transistor 56 at the Gate 58, the first transistor 56 will switch to an OFF state.

In such a situation, the voltage at the Gate 76 of the second transistor 74 is no longer kept low. Rather, the voltage at the Gate 76 of the second transistor 74 is sufficient to switch the second transistor 74 to an ON state.

More particularly, it is noted that the OFF resistance of the first transistor 56 between the Source and Drain electrodes 60 and 62 must be taken into account when assessing the voltage that is received at the Gate 76 to cause the second transistor 74 to be switched to an ON state. Such an OFF resistance may be on the order of 2000 KΩ, which is connected in series with the first resistor 64 which, as suggested above, may have a resistance on the order of 500 KΩ. When the voltage across the terminals 52A and 52B of the capacitor 46 has dropped sufficiently that it can no longer overcome the breakdown voltage of the Zener diode 68 and also meet the threshold voltage at the Gate 58 of the first transistor 56, the exemplary resultant voltage across the terminals 52A and 52B of the capacitor 46 will be approximately 21 volts. If such voltage is applied to the first resistor 64 and the OFF resistance of the first transistor 56 between the Source and Drain electrodes 60 and 62 (2000 KΩ), the voltage at Gate 76 will thus be roughly 16.8 volts, which will switch the second transistor 74 to an ON state.

This causes the charge remaining in the capacitor 46 to begin being discharged through a single channel, i.e., the channel that is between the Source and Drain electrodes 80 and 82 and that further includes the third resistor 88. Since in such a situation the charge in the capacitor 46 is discharging primarily through the third resistor 88 which, as suggested above, may have a resistance of 2 KΩ, discharging of a second portion of the charge stored in the capacitor 46 occurs at a second rate indicated at the second segment 92 in FIG. 2, which is a rate that is greater than the first rate as indicated in the first segment 90.

As can be understood from FIG. 2, the second segment 92 indicates that the second rate of discharge of the capacitor 46 is a much greater rate of discharge than the first rate of discharge as indicated in the first segment 90. That is, the second segment 92 has a much greater slope, i.e., drop in capacitor voltage as a function of time, than the first segment 90. In particular, it can be seen from FIG. 1 that the discharge of the first portion of the charge occurs through the first resistor 64 (having an exemplary resistance of 500 KΩ) arranged in parallel with the second and third resistors 84 and 88 (which are themselves arranged in series to provide a combined resistance of 503 KΩ) for a total resistance across the first, second, and third resistors 64, 84, and 88 arranged as such of about 251 KΩ. In the depicted exemplary embodiment, the 251 KΩ resistance afforded by the first, second, and third resistors 64, 84, and 88 is an entire order of magnitude greater than the exemplary resistance of 2 KΩ afforded by the third resistor 88, and is actually closer to two orders of magnitude. Such a difference in the resistance values permits the first and second portions of the charges in the capacitor 46 to be discharged at such significantly different rates, and it is reiterated that different resistance values and relationships may be employed without departing from the present concept. In the exemplary embodiment depicted herein, the discharge of the second portion of the capacitor charge takes roughly thirty seconds. Thus, the capacitor 46 will have discharged to a safe level within no more than about 180 seconds, i.e., three minutes, from the completion of the ARM command.

It is noted that the OFF resistance of the first transistor 56 will be selected so that the voltage at the Gate 76 is sufficiently close to the voltage drop across the third resistor 88 that the second transistor 74 remains in an ON state for a sufficient period of time to discharge the capacitor 46 to be at a safe level. While the second transistor 74 can come out of saturation, it desirably will not switch to an OFF state until the capacitor 46 has discharged sufficiently to reach a safe condition.

Once the voltage across the terminals 52A and 52B of the capacitor 46 has dropped sufficiently that the second transistor 74 is in an OFF state, whatever remains of the charge in the capacitor 46 will discharge through a separate channel that includes the second resistor 84 and the third resistor 88 in series. Such a discharge is indicated at a third segment 94 in FIG. 2, which is a rate that is less than the first and second discharge rates represented by the first and second segments 90 and 92. With the capacitor 46 discharged in such a fashion, the squib control circuit 4 advantageously resists unintended energizing of the squib 6, which is desirable.

With further regard to the third segment 94 in FIG. 2, it is noted that the threshold voltage at the Gate 58 that can switch the first transistor 56 to an ON state is in the range of 1.0 to 2.0 volts, which is similar to the threshold voltage of the second transistor 74. This voltage must be below the "safe" state level for the squib 6. The exemplary cable resistance 48 is in the range of 1.0 to 3.0Ω depending upon the conductor size, cable length, and ambient temperature. With a cable resistance 48 of 1.0Ω and a specified "safe no-fire" current of 1.0 amps for the squib 6, 2.0 volts should be the maximum value allowed for the threshold voltage at the Gate 58 of the first transistor 56.

With regard to the initial charging of the capacitor 46 after issuance of the ARM command, it is noted that the voltage divider provided by the charging resistor 44 and the first resistor 64 times the minimum input voltage must be higher than the sum of the breakdown voltage of the Zener diode 68 plus the threshold voltage of the first transistor 56 at the Gate 58 in order to ensure that the first transistor 56 will be switched to an ON state and that the second transistor 74 will be switched to an OFF state during charging in order to ensure that the charging cycle will allow the full voltage to be reached on the capacitor 46. Moreover, the combination of the breakdown voltage of the Zener diode 68, the threshold voltage of the first transistor 56, and the time constant RC of the capacitor 46 discharging through the channels that include the first, second, and third resistors 64, 84, and 88, will determine the point at which rapid discharge of the capacitor 46 begins. This must be sufficiently in advance of a predetermined period of time after a full charge is reached on the capacitor 46. Such an exemplary predetermined period of time is five minutes, although it is noted that rapid discharge in the depicted exemplary embodiment occurs after only two and one-half minutes. Lowering the breakdown voltage of the Zener diode 68 can improve the ability of the first transistor 56 to be retained in the ON state and the second transistor 74 to be retained in the OFF state during the charging cycle to allow full charging of the capacitor 46.

With regard to FIG. 3, which depicts capacitor voltage as a function of time during the charging cycle, it is noted that the second transistor 74 will be in an ON state during at least a portion of the charging cycle, and thus some of the available charging current will be shunted through the third resistor 88. The voltage divider established by the charging resistor 44 and the third resistor 88 determines the asymptotic voltage of the capacitor charging curve until the point as which the voltage at the Gate 58 of the first transistor 56, i.e., the voltage across the terminals 52A and 52B of the capacitor 46 minus the breakdown voltage of the Zener diode 68, reaches the threshold voltage for the first transistor 56. Once the threshold voltage of the first transistor 56 is reached, the first transistor 56 switches to an ON state and the second transistor 74 is switched to an OFF state, which allows the capacitor 46 to be fully charged such that its voltage across the terminals 52A and 52B reaches that of the first electrical energy source 14. The voltage threshold of the first transistor 56 is indicated in dashed lines with the numeral 96 in FIG. 3.

Advantageously, therefore, after the issuance of the ARM command and the full charging of the capacitor 46, an extended period of time is provided during which the charge in the capacitor 46 is of a sufficient level that it can energize the squib 6. While thirty seconds had been deemed to be the minimally accepted value, the exemplary disclosed embodiment actually provides 150 seconds within which the FIRE command can be issued. The FIRE command can be issued or can be easily be performed manually within this period of time.

Further advantageously, the capacitor 46 is sufficiently discharged to a "safe" state within a second predetermined period of time which had minimally been suggested to be five minutes. In the exemplary embodiment depicted herein, discharging along the first and second segments 90 and 92 of FIG. 3 occur within 180 seconds, i.e., three minutes.

An exemplary rate of discharge that would occur with conventional non-solid-state components is indicated in dashed lines in FIG. 2. The discharge curve provided by the improved squib control circuit 4 thus advantageously provides for desirably maintaining a charge in the capacitor 46 for a sufficient period of time that the squib 6 can be energized, and also promptly discharges the capacitor 46 if a FIRE command is not issued. The squib control circuit 4 thus advantageously provides reliable yet safe operation.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A circuit structured to energize another device, the circuit comprising:
   a capacitor structured to at least temporarily store a charge;
   a FIRE switch;
   a portion of the circuit comprising a first solid state switch and being structured to discharge a first portion of the charge at a first rate;
   another portion of the circuit comprising a second solid state switch and being structured to discharge a second portion of the charge subsequent to the discharge of the first portion of the charge and at a second rate greater than the first rate; and
   the capacitor having stored therein prior to the onset of the discharge of the second portion of the charge an energizing portion of the charge sufficient to energize the other device; and
   the FIRE switch being actuatable to discharge the energizing portion of the charge and to thereby energize the another device prior to the onset of the discharge of the second portion of the charge.

2. The circuit of claim 1 wherein the first solid state switch is a first transistor, and wherein the second solid state switch is a second transistor.

3. The circuit of claim 2 wherein the portion of the circuit comprises a Zener diode connected between a terminal of the capacitor and a gate of the first transistor.

4. A circuit structured to energize another device, the circuit comprising:
a capacitor structured to at least temporarily store a charge;
a portion of the circuit comprising a first solid state switch and being structured to discharge a first portion of the charge at a first rate;
another portion of the circuit comprising a second solid state switch and being structured to discharge a second portion of the charge subsequent to the discharge of the first portion of the charge and at a second rate greater than the first rate;
the capacitor having stored therein prior to the onset of the discharge of the second portion of the charge a portion of the charge sufficient to energize the other device;
wherein the portion of the circuit comprises a Zener diode connected between a terminal of the capacitor and a gate of the first transistor; and
wherein the portion of the circuit further comprises at least a first resistor that is connected with an electrode of the first transistor and that is structured to be further connected with the terminal of the capacitor, at least one of the resistance of the at least first resistor and the breakdown voltage of the Zener diode being selected at least in part to cause the capacitor to retain for at least a predetermined period of time during the discharge of the first portion of the charge the portion of the charge sufficient to energize the other device.

5. The circuit of claim 4 wherein at least a part of the another portion of the circuit is selected at least in part to cause a predetermined voltage across the terminals of the capacitor to be reached within another predetermined period of time after the onset of the discharge of the first portion of the charge.

6. The circuit of claim 1 wherein a further portion of the circuit is structured to discharge a remaining portion of the charge subsequent to the discharge of the second portion of the charge and at a third rate less than the first rate.

7. The circuit of claim 3 wherein the portion of the circuit further comprises at least a first resistor that is connected between the terminal of the capacitor and an electrode of the first transistor, and wherein the electrode of the first transistor is further connected with a gate of the second transistor.

8. The circuit of claim 7 wherein an electrode of the second transistor is connected with the terminal of the capacitor.

9. A circuit structured to energize another device, the circuit comprising:
a capacitor structured to at least temporarily store a charge;
a portion of the circuit comprising a first solid state switch and being structured to discharge a first portion of the charge at a first rate;
another portion of the circuit comprising a second solid state switch and being structured to discharge a second portion of the charge subsequent to the discharge of the first portion of the charge and at a second rate greater than the first rate;
the capacitor having stored therein prior to the onset of the discharge of the second portion of the charge a portion of the charge sufficient to energize the other device;
wherein the portion of the circuit comprises a Zener diode connected between a terminal of the capacitor and a gate of the first transistor;
wherein the portion of the circuit further comprises at least a first resistor that is connected between the terminal of the capacitor and an electrode of the first transistor, and wherein the electrode of the first transistor is further connected with a gate of the second transistor;
wherein an electrode of the second transistor is connected with the terminal of the capacitor; and
wherein the portion of the circuit further comprises a second resistor connected with the electrode of the second transistor and with another electrode of the second transistor, the second transistor being structured to form a conductive channel between the electrode and the another electrode when a voltage to the gate of the second transistor is at or above a threshold voltage.

10. The circuit of claim 9 wherein the at least first and second resistors are of substantially equal resistance.

11. The circuit of claim 9 wherein the portion of the circuit further comprises a third resistor connected between the another electrode of the second transistor and a ground of the circuit.

12. A circuit structured to energize another device, the circuit comprising:
a capacitor structured to at least temporarily store a charge;
a portion of the circuit comprising a first solid state switch and being structured to discharge a first portion of the charge at a first rate;
another portion of the circuit comprising a second solid state switch and being structured to discharge a second portion of the charge subsequent to the discharge of the first portion of the charge and at a second rate greater than the first rate;
the capacitor having stored therein prior to the onset of the discharge of the second portion of the charge a portion of the charge sufficient to energize the other device;
wherein the portion of the circuit comprises a Zener diode connected between a terminal of the capacitor and a gate of the first transistor;
at least one of the portion of the circuit and the another portion of the circuit is structured to cause the first portion of the charge to flow through a first number of resistors;
at least one of the portion of the circuit and the another portion of the circuit is structured to cause the second portion of the charge to flow through a second number of resistors; and
the first number of resistors has a first resistance at least about one order of magnitude greater than a second resistance of the second number of resistors.

13. The circuit of claim 12 wherein a further portion of the circuit is structured to discharge a remaining portion of the charge subsequent to the discharge of the second portion of the charge and at a third rate less than the first rate.

14. The circuit of claim 1 wherein the circuit further comprises an ARM switch, the ARM switch and the FIRE switch each being independently movable between an OPEN condition and a CLOSED condition, the circuit being substantially disconnected from power sources external to the circuit when the ARM and FIRE switches are in the OPEN condition.

* * * * *